Feb. 15, 1927.
I. B. TANNER
TANK
Filed June 27, 1925
1,617,355
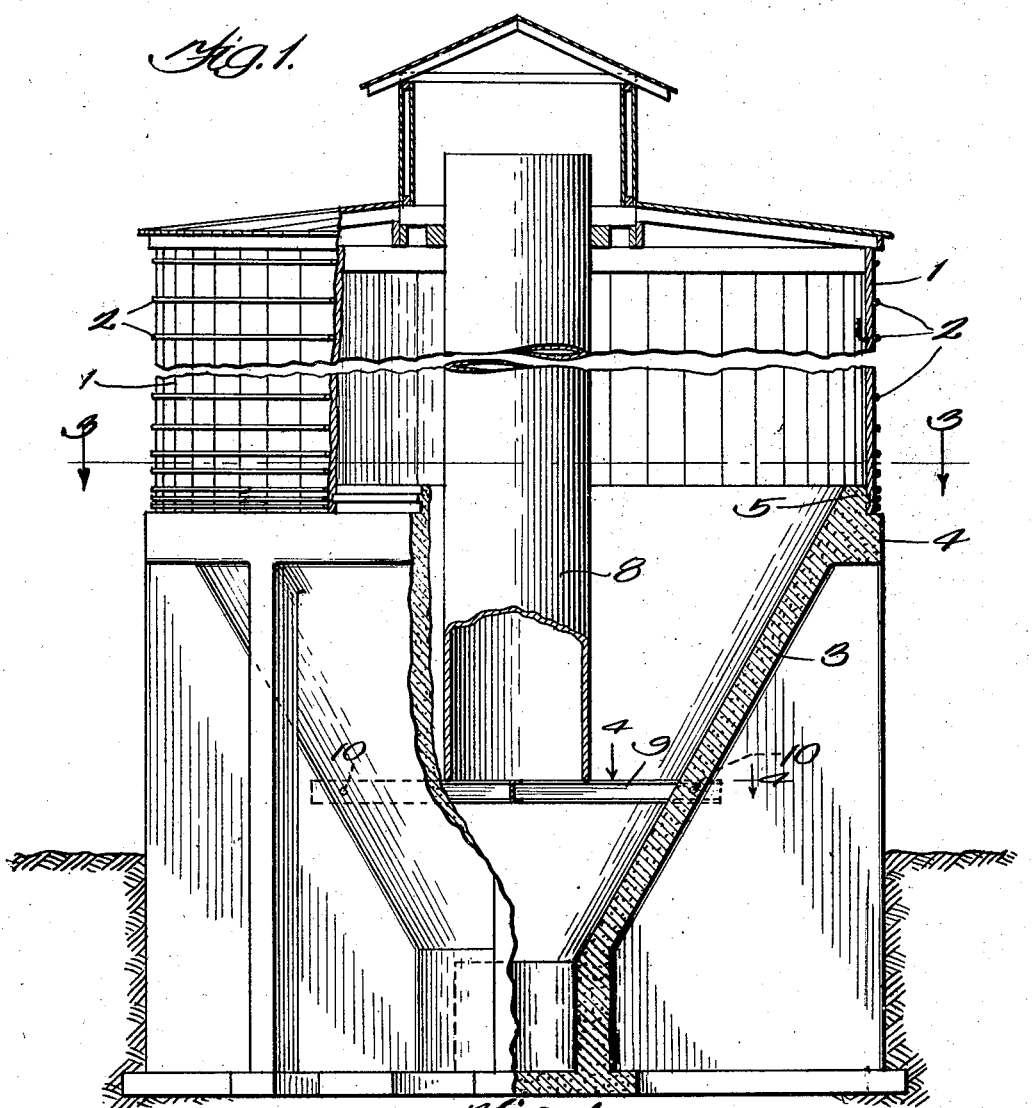
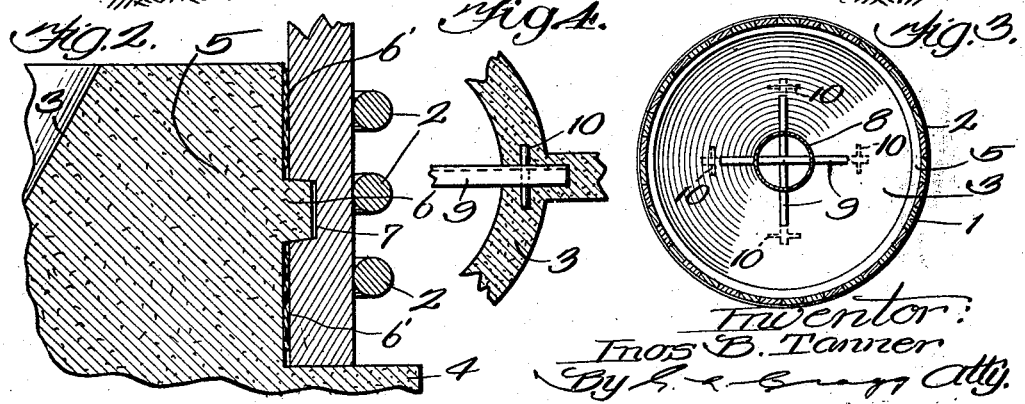

Patented Feb. 15, 1927.

1,617,355

UNITED STATES PATENT OFFICE.

INOS B. TANNER, OF CHICAGO, ILLINOIS, ASSIGNOR TO JOSEPH E. NELSON & SONS, OF CHICAGO, ILLINOIS, A COPARTNERSHIP CONSISTING OF JOHN E. NELSON AND WILLIAM H. NELSON.

TANK.

Application filed June 27, 1925. Serial No. 40,022.

My invention relates to tanks employing conical concrete bottoms and employed as settling tanks in water softening or liquid treating equipment and containing reaction chambers in which raw water and softening chemicals are initially received.

In carrying out my invention a platform of rails is moulded into the sides of the concrete bottom of such tank to reinforce the concrete and serving as a support for the reaction chamber whose bottom end is open and communicates with the settling tank through the platform.

The preferred form of the invention is shown in the accompanying drawing in which Fig. 1 is a view of a tank, partially in elevation and partially in section, equipped in accordance with my invention; Fig. 2 is a view, on a larger scale, of a part of the structure as it appears in Fig. 1; Fig. 3 is a view, on a smaller scale, on line 3—3 of Fig. 1; and Fig. 4 is a view, on a larger scale, on line 4—4 of Fig. 1.

The settling tank has a body portion 1 preferably formed of upright wooden staves held together by hoops 2 that are preferably in the form of rods. The tank body 1 has a moulded concrete relatively thin conical bottom 3 formed with an outer ledge 4 at its larger and upper end upon which the wooden tank body rests and an annular upper continuation 5 about which the lower end of the tank body is disposed and against which the tank body is closely confined by the hoops 2. A surrounding horizontal annular shoulder 6 is included in the formation of the bottom continuation 5 and is snugly received in an internal horizontal annular groove 7 formed within the lower end of the tank body, whereby the joint between the tank body and its concrete bottom is made fluid tight. The fluid tight assembly of the tank body and tank bottom may be reinforced by calking 6'.

Where the tank is employed as a settling tank in water softening equipment it contains a reaction chamber or tank 8. This reaction chamber is supported upon a transverse platform formed of crossed rails 9, preferably channel irons. This platform is moulded into an intermediate part of the relatively thin concrete portion 3 and is located substantially midway between the top and bottom of this wall portion, thereby serving most effectively to reinforce the same. The chamber 8 is open at its bottom end so that the intermixed water and softening chemical may flow downwardly therefrom through the spaces in the platform into the settling tank. The platform not only serves to support the tank, but, being moulded into an intermediate portion of the tapering part of the concrete bottom, also serves to reinforce this bottom. To this end the ends of the rails comprising the platform may carry cross bars 10 about which the intermediate portion of the tapering part of the concrete tank bottom is moulded.

Features not herein claimed form the subject matter of a division of this application, Serial No. 83,414, filed January 22, 1926.

Having thus described my invention, I claim:

The combination with a settling tank having a bottom of concrete formed with a thin conical wall portion; of a transverse platform moulded into an intermediate part of said thin conical wall portion substantially midway between the top and bottom of said wall portion and serving to reinforce the same; and a reaction chamber within the tank carried by said platform and whose bottom end communicates with said tank through said platform.

In witness whereof, I hereunto subscribe my name.

INOS B. TANNER.